Nov. 6, 1956    F. A. LEE    2,769,656
VEHICLE CAB AND FRONT END MOUNTING
Filed July 31, 1953    2 Sheets-Sheet 1
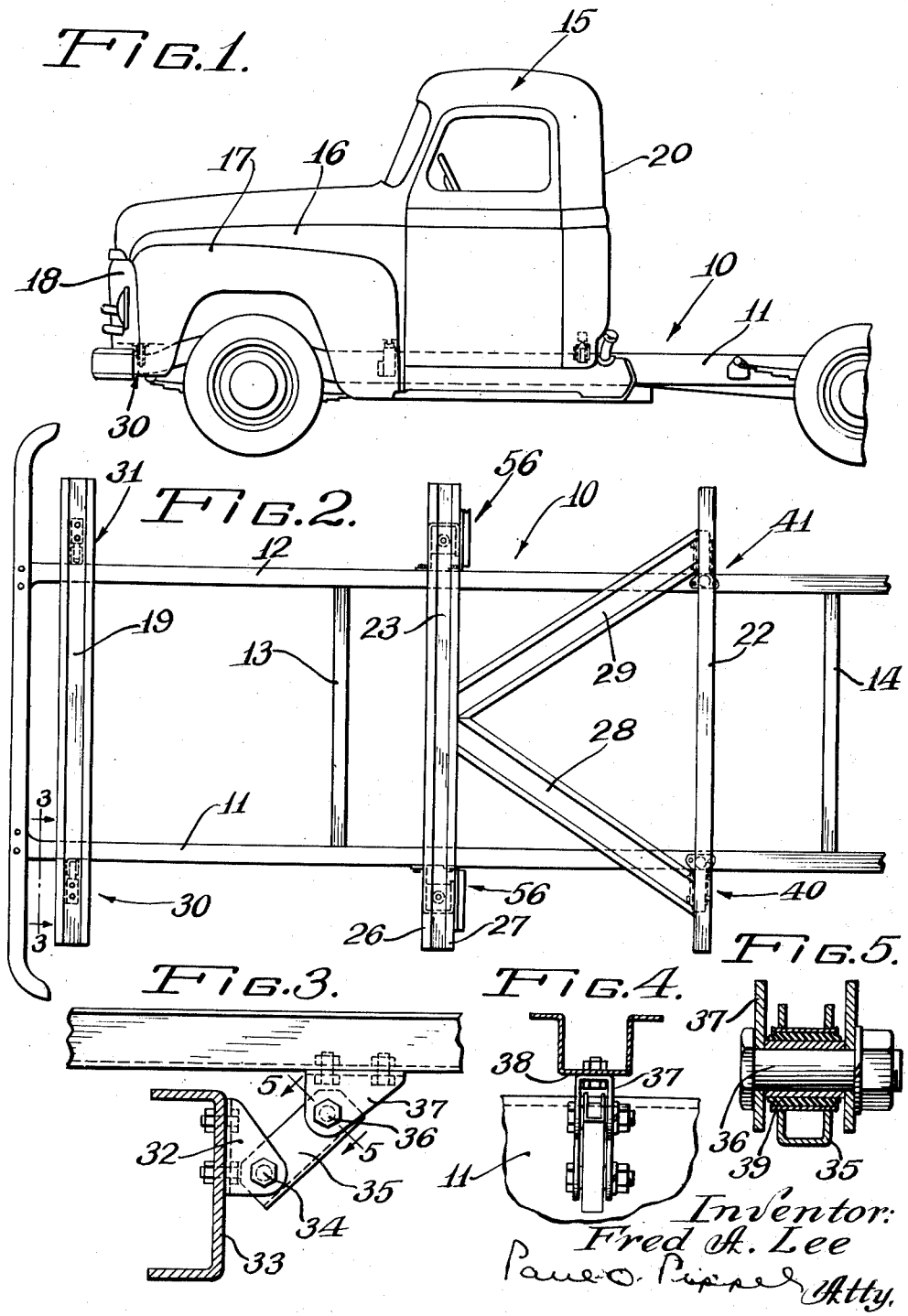

Nov. 6, 1956 — F. A. LEE — 2,769,656
VEHICLE CAB AND FRONT END MOUNTING
Filed July 31, 1953 — 2 Sheets-Sheet 2
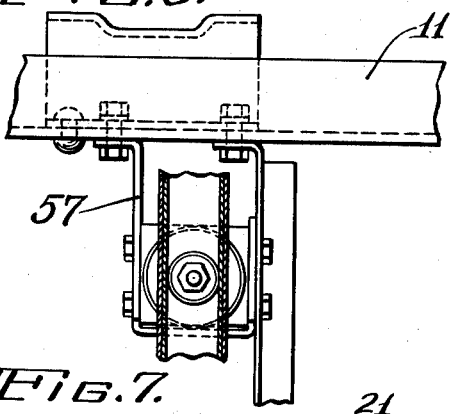
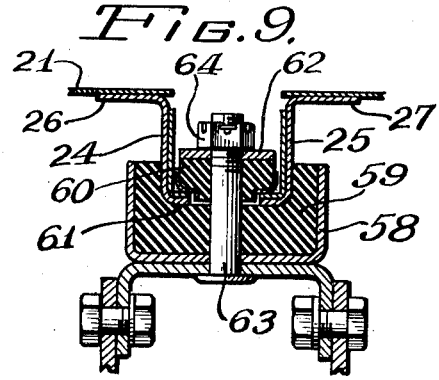
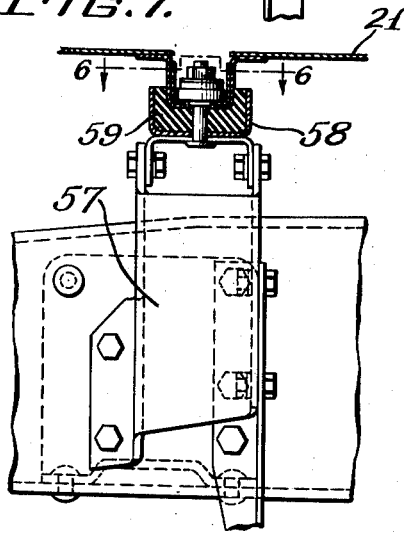
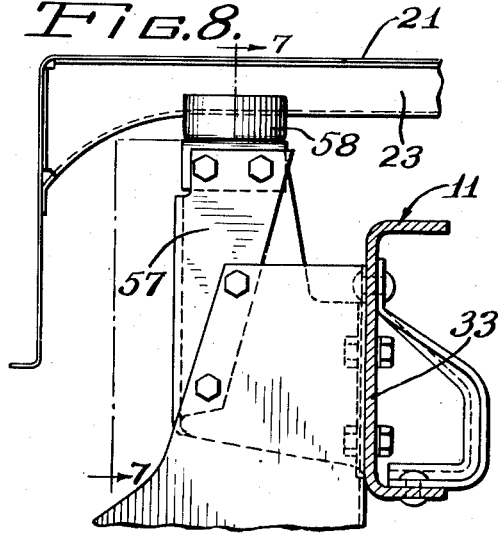
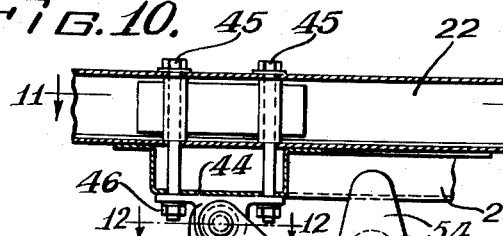
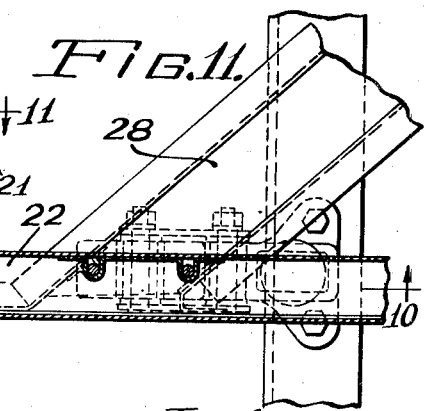
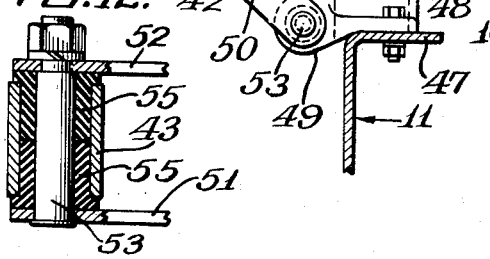
Inventor:
Fred A. Lee United States Patent Office 2,769,656
Patented Nov. 6, 1956

2,769,656

VEHICLE CAB AND FRONT END MOUNTING

Fred A. Lee, Fort Wayne, Ind., assignor to International Harvester Company, a corporation of New Jersey Application July 31, 1953, Serial No. 371,567

7 Claims. (Cl. 296—35)

This invention relates to body mounting means for automotive vehicles, and more particularly to new and improved mounting connections and the arrangement of the mounting connections for supporting a motor truck cab and the sheet metal structure, such as the hood, fenders and radiator grille panel connected thereto, on the chassis frame.

In the operation of trucks or other vehicles designed for carrying heavy loads over an uneven terrain or road surface irregularities one or more ground engaging wheels are elevated to a different level than the other wheels with the result that severe torsional stresses and forces are imposed on the chassis frame. While it is possible to construct chassis frames with sufficient rigidity to withstand the torsional forces applied thereto, it has been found impractical to do so. Consequently, in order to mitigate the damaging influence of the torsional forces on the chassis frame, the chassis frames are generally designed and constructed in such a way that they are relatively flexible and, thereby, capable of relieving the torsional forces imposed thereon by distortion of the frame side sills without damage to the chassis frames.

It will be appreciated that the former practice of securing the vehicle cab or operator's compartment and the sheet metal work, such as the hood, fenders and radiator grille panel which is rigidly connected to the cab, directly to the chassis frame in such a manner that very little, if any, relative movement between the chassis frame and the body structure was permitted had to be abandoned. Various ingenious mounting means have been devised for mounting the vehicle cab on the flexible frame whereby the distorting forces and shocks to which the frame is subjected are not directly and fully transmitted to the vehicle cab to cause deformation and ultimate breakage of the sheet metal parts thereof. However, little or no consideration has been given to the problem of supporting the front end sheet metal work, particularly the hood, fenders and radiator grille panel, on the flexible frame which parts are also connected to the vehicle cab. Heretofore, it has been the usual practice in the motor truck industry to secure the radiator grille panel and thus the hood and fenders directly to the frame in a relatively rigid manner. As a result, the vehicle cab was permitted to twist and bend with respect to the front end structure when the chassis frame was subjected to torsional forces causing deformation, fatigue and ultimate breakage of the sheet metal parts interconnecting the vehicle cab and the front end structure as well as the connection of the radiator grille panel to the frame. It is, therefore, the primary objective of the present invention to provide a novel means for supporting a vehicle body which includes a cab, hood, fenders and grille panel on a flexible chassis frame whereby the parts of the body are movable with respect to the frame as a structural composite unit in order to mitigate the transmission of forces, shocks and vibrations thereto.

Another object of the invention is to connect the vehicle body to the chassis frame at three longitudinally spaced pairs of points to thereby allow a limited, but adequate, relative movement between the body and frame.

A further object is to respectively connect the extreme forward and rearward end portions of the vehicle body unit to the chassis frame by means of a pair of transversely spaced links and to secure transversely spaced, intermediate portions of the vehicle body to the frame side sill members by means of a pair of resilient mounting connections.

A still further object is to provide a pair of transversely spaced links each having one end pivotally connected to the radiator grille panel and its opposite end pivotally connected to a respective frame side sill member.

The foregoing and other important objects and desirable features inherent in and encompassed by the invention, together with many of the purposes and uses thereof, will become readily apparent from a reading of the ensuing description in conjunction with the annexed drawing, in which:

Figure 1 is a side elevational view of a motor vehicle embodying the invention;

Figure 2 is a plan view of the forward end of the vehicle structure shown in Figure 1 with a portion of the vehicle body cut away to better illustrate the body cross members;

Figure 3 is an enlarged, detailed view taken substantially along line 3—3 of Figure 2 showing the connection between one end of the lower edge of the grille panel and a frame side sill member;

Figure 4 is a side elevational view, partially in section, of the mounting connection shown in Figure 3;

Figure 5 is a sectional view taken substantially along line 5—5 of Figure 3;

Figure 6 is a plan view, partially in section, of one of the resilient mounting connections taken substantially along the line 6—6 of Figure 7;

Figure 7 is a cross sectional view taken substantially along line 7—7 of Figure 8;

Figure 8 is an end elevational view of one resilient mounting connection;

Figure 9 is an enlarged, detailed view of the mounting connection shown in Figures 6, 7 and 8;

Figure 10 is a vertical sectional view of a rear body mounting connection taken substantially along line 10—10 of Figure 11;

Figure 11 is a plan view, partially in section, of a mounting connection taken substantially along line 11—11 of Figure 10; and Figure 12 is a sectional view taken substantially along line 12—12 of Figure 10.

Referring to the drawings in detail, wherein like reference characters designate like elements throughout the various views, there is shown a motor truck chassis frame 10 which includes a pair of longitudinally extending, laterally spaced side sill members 11 and 12 having the conventional U-shaped form. The side sill members 11 and 12 are interconnected by a plurality of longitudinally spaced, laterally extending cross members 13 and 14. Only two cross members are shown but it is to be understood that others are provided as in conventional motor truck chassis frame constructions.

The vehicle structure or body, illustrated somewhat diagrammatically in Figure 1, includes an operator's compartment or cab, designated in its entirety by reference character 15. Connected to the cab 15 and extending forwardly therefrom is a hood structure 16 which encloses the power plant (not shown). A pair of fenders 17 (only one is shown in Figure 1) are attached to respective opposite sides of the hood structure 16. Suitably secured to the forward extremity of the hood structure 16 is a vertically disposed radiator grille panel 18.

As shown in Figure 2, a U-shaped cross member 19 is rigidly fastened to the lower edge of the radiator grille panel 18. The cross member 19 extends transversely with respect to the chassis frame 10 and has portions thereof disposed laterally of the side sill members 11 and 12. The back panel 20 of the cab 15 extends downwardly and is secured to the cab floor panel 21. A transversely extending rear cab cross member 22 is suitably secured to the upwardly facing surface of the floor panel 21 adjacent to the back panel 20. Extending transversely along the forward end of the cab 15 is a channel-shaped cross member 23. The legs 24, 25 of the cross member 23 extend upwardly and are provided with horizontal, oppositely projecting flanges 26, 27, respectively, which are suitably secured to the underside of the floor panel 21. In order to increase the rigidity of the body structure 15, a pair of rearwardly diverging channel members 28, 29, each having one end adjacent the mid section of cross member 23 and its opposite end adjacent a respective end of the rear cab cross member 22, are secured to the underside of the floor panel 21 by any suitable means.

The forward end of the vehicle body structure is connected to the chassis frame 10 by means of a pair of mounting connections 30, 31. Figures 3, 4 and 5 illustrate, in detail, only the construction of mounting connection 30, but it is to be understood that mounting connection 31 is constructed in a like manner. Each mounting connection 30, 31 includes a bracket 32 rigidly fastened to the vertical web portion 33 of a respective side sill member 11, 12 which is provided with a horizontally extending pivot pin 34 for pivotally supporting one end of a link 35. The link 35 extends upwardly and outwardly and its opposite end is pivotally connected to a pivot pin 36 supported by a depending bracket 37 secured to the horizontal web 38 of the cross member portion 19 overhanging the respective side sill member 11 or 12, as shown in Figures 2 and 3. Encircling each pivot pin 34, 36 are sleeve-like rubber bushings or insulators 39. By interposing the rubber bushings 39 between the pivot pins 34, 36 and the ends of the links 35 the connected parts are effectively insulated and a limited pivotal relative movement therebetween, by deformation of the rubber bushings, is allowed.

Referring to Figures 10, 11 and 12, it will be noted that the rearward end of the vehicle body is similarly connected to the chassis frame 10 by means of a pair of laterally spaced mounting connections 40, 41. Each mounting connection 40, 41, which connections are symmetrically disposed, includes a bracket 42, provided with a bearing portion 43, secured to the underside of the web 44 of a respective channel member 28, 29 at its extreme rearward end by means of bolts 45 and nuts 46. Attached to the uppermost flanges 47 of the side sill members 11 and 12 by any suitable means are brackets 48 which also are provided with bearing portions 49. Interconnecting each pair of respective brackets 42 and 48 is a link member 50 which consists of a pair of spaced plates 51, 52. Each end of the link member 50 carries a horizontally extending pivot pin 53 which extends through a respective bearing portion 43, 49. Disposed about each pivot pin 53 between the plates 51, 52 are a pair of rubber bushings 55 which are engaged by a respective bearing portion 43, 49 rather tightly whereby the bushings are incapable of slipping with respect to bearing portion or the pivot pin. The utilization of rubber bushings, as noted above, effectively insulates the parts and allows a limited pivotal relative movement therebetween by deformation of the rubber bushings. In order to prevent metal to metal contact when the vehicle body structure is caused to move relatively toward chassis frame 10, an upwardly projecting pad 54 of rubber or like cushioning material is suitably secured to each bracket 48, as shown in Figures 10 and 11. By virtue of the above described mounting connections, it will be appreciated that the body structure including the cab 15, hood structure 16 and radiator grille panel 18 is mounted for limited oscillation on a generally horizontal and longitudinal axis as a composite structural unit.

Inasmuch as the body structure is mounted for oscillation, a pair of mounting connections, each being designated in their entirety by numeral 56, are provided for stabilizing the oscillating movement. Each mounting connection 56 comprises a bracket structure 57, secured to the web 33 of a respective side sill member 11, 12, which, in turn, supports a generally U-shaped member 58. The U-shaped member 58 serves as a pocket for confining a generally U-shaped layer or pad 59 of resilient material. As best shown in Figures 8 and 9, an end portion of the cross member 23 is adapted to seat itself on the pad 59 and be partially embraced thereby. An annular pad 60 is positioned on the upwardly facing surface of the web 61 of the cross member 23 in vertical alignment with the U-shaped pad 59 upon which a retainer washer 62 is placed. A vertical bolt 63 extends through the member 58, web 61, washer 62, and pads 59 and 60 and is engaged by a lock nut 64 for clamping the parts together. It will be appreciated that the mounting connections 56 permit the body structure to move vertically and, to a limited extent, horizontally with respect to the chassis frame 10.

By constructing the mounting connections as specifically described above, the possibility of metal to metal contact between the body structure and the frame 10 is eliminated. It will also be appreciated that the resilient material interposed between the body and frame parts reduces the transfer of vibration and noise to the body structure. Furthermore, by arranging the mounting connections, as pointed out hereinbefore, the body structure as a whole is capable of oscillating about a longitudinal axis with respect to the frame 10 and, thus, any flexing of the frame imposes very little strain upon the body structure and since the body structure is movable relatively to the frame as a unit the possibility of damage caused by the vehicle cab moving relatively to the hood structure and radiator grille panel is mitigated.

The embodiment of the invention chosen for the purposes of illustration and description herein is that preferred for achieving the objects of the invention and developing the utility thereof in the most desirable manner, due regard being had to existing factors of economy, simplicity of design and construction, and the improvements sought to be effected. It will be appreciated, therefore, that the particular structural and functional aspects emphasized herein are not intended to exclude, but rather to suggest, such other modifications and adaptations of the invention as fall within the spirit and scope of the invention as defined in the appended claims.

What is claimed is:

1. In a motor vehicle having a longitudinal frame comprising a pair of longitudinally extending, transversely spaced side sill members; a vehicle body including an operator's compartment, a hood structure extending forwardly from said operator's compartment and secured thereto, and a vertically disposed, transversely extending grille radiator panel secured to said hood structure and defining the forward extremity of said body, said body further including a first transversely extending cross member secured to the lower edge of said radiator grille panel, a second transversely extending cross member secured to the underside of the rearward end of said operator's compartment, and a transversely extending channel-shaped member secured to the underside of said body and being longitudinally spaced between said first and second cross members; means for supporting said body above said frame including a pair of transversely spaced links, each of said links having one end pivotally connected to a respective sill member and its opposite end pivotally connected to a respective end portion of said first cross member, a second pair of transversely spaced links, each of said links having one end pivotally connected to a respective sill member and its opposite end pivotally connected to a respective end portion of said second cross member, and a pair of transversely spaced, resilient mounting connections between respective opposite ends of said channel-shaped member and said sill members, said resilient mounting connections being longitudinally spaced between said first and second pairs of links.

2. In a motor vehicle substantially as set forth in claim 1, in which each of said resilient mounting connections includes a bracket secured to a respective side sill member, said brackets serving as supports for a pair of U-shaped members, each of said U-shaped members having a pad of resilient material disposed therein upon which the outwardly facing surfaces of respective opposite end portions of said channel-shaped member are adapted to bear, each of said resilient mounting connections further including a second pad of resilient material abutting the inwardly facing surface of a respective end portion, and fastening means extending vertically through said bracket, U-shaped member, channel-shaped member, and said pads for clamping them together.

3. In a motor vehicle having a longitudinal frame comprising a pair of longitudinally extending, transversely spaced side sill members; a vehicle body including an operator's compartment, a hood structure extending forwardly from said operator's compartment and secured thereto, and a vertically disposed, transversely extending radiator grille panel secured to said hood structure and defining the forward extremity of said body; means for supporting said body above said frame including a first pair of transversely spaced links, each of said links having one end pivotally connected to a respective sill member and its opposite end pivotally connected to a respective end portion of the lower edge of said radiator grille panel, a second pair of transversely spaced links, each of said links having one end pivotally connected to a respective sill member and its opposite end pivotally connected to a respective side of the rearward end of said operator's compartment, and a pair of transversely spaced resilient mounting connections between respective opposite sides of said body and said sill members, said resilient mounting connections being longitudinally spaced between said first and second pairs of links.

4. In a motor vehicle substantially as set forth in claim 3, in which each of said resilient mounting connections includes an upwardly opening pocket carried by said respective sill member having a pad of resilient material disposed therein, a transversely extending channel member secured to the underside of said body having the outwardly facing surface of an end portion thereof abutting said pad, a second pad of resilient material abutting the inwardly facing surface of said end portion, and fastening means extending vertically through said pocket, channel and pads for clamping said pocket, channel and pads together.

5. In a motor vehicle having a longitudinal frame comprising a pair of longitudinally extending, transversely spaced side sill members; a vehicle body including a radiator grille panel defining the forward end of said body; means for supporting said body on said frame including a first pair of transversely spaced links, each of said links having one end pivotally connected to a respective sill member for pivotal movement with respect thereto about a substantially horizontal and longitudinally extending axis and its opposite end pivotally connected to a respective opposite side of said radiator grille panel for pivotal movement with respect thereto about a substantially horizontal and longitudinally extending axis; a second pair of transversely spaced links, each of said links having one end pivotally connected to a respective sill member for pivotal movement with respect thereto about a substantially horizontal and longitudinally extending axis and its opposite end pivotally connected to a respective opposite side of the rearward end of said body for pivotal movement with respect thereto about a substantially horizontal and longitudinally extending axis; means for connecting a portion of each of said sill members to a respective side of said body, said sill portions being longitudinally spaced between said first and second pairs of links and said means including a pad of resilient material disposed between each sill portion and a respective side of said body and fastening means for clamping said pads, sill portions and sides of said body together.

6. In a motor truck having a longitudinal frame, an operator's compartment, a radiator grille panel spaced forwardly of said operator's compartment, and means rigidly interconnecting said operator's compartment and said radiator grille, the combination including said frame, operator's compartment, radiator grille panel and means rigidly interconnecting said operator's compartment and said radiator grille; comprising means for connecting the rearwardmost end of said operator's compartment to said frame for controlled relative movement therebetween; means for connecting said radiator grille panel to said frame whereby said radiator grille panel and said operator's compartment move relatively to said frame as a composite structural unit including a pair of laterally spaced links, each link having one end pivotally connected to said frame and its opposite end pivotally connected to a respective opposite end portion of said radiator grille panel for pivotal movement with respect to said frame and radiator grille panel about substantially horizontal and longitudinally extending axes; and means for resiliently clamping portions of said operator's compartment-radiator grille panel composite structural unit to said frame, said portions being longitudinally spaced between said radiator grille panel and the rearwardmost end of said operator's compartment.

7. In a motor truck having a longitudinal frame, an operator's compartment mounted on said frame for controlled relative movement therebetween, a radiator grille panel spaced forwardly of said operator's compartment and means rigidly interconnecting said operator's compartment and said radiator grille panel; the combination including said frame, radiator grille panel, and said means rigidly interconnecting said operator's compartment and said radiator grille panel; comprising means for connecting said radiator grille panel to said frame including a pair of laterally spaced links, each link having one end pivotally connected to a respective opposite side of said frame and its opposite end pivotally connected to a respective opposite end portion of said radiator grille panel, the pivotal axes of said links with respect to said frame and said radiator grille panel being disposed substantially horizontally and extending longitudinally.

References Cited in the file of this patent

UNITED STATES PATENTS

| 2,004,258 | Waterbury | June 11, 1935 |
| 2,171,947 | Parker | Sept. 5, 1939 |
| 2,279,806 | Westrope | Apr. 14, 1942 |
| 2,485,794 | Waterbury et al. | Oct. 25, 1949 |
| 2,549,102 | Kramer | Apr. 17, 1951 |
| 2,564,888 | Foley et al. | Aug. 21, 1951 |

FOREIGN PATENTS

| 575,947 | France | May 2, 1924 |
| 497,189 | Germany | May 5, 1930 |
| 513,667 | Great Britain | Oct. 18, 1939 |